(12) United States Patent  
Ando et al.

(10) Patent No.: US 9,395,551 B2
(45) Date of Patent: Jul. 19, 2016

(54) OPTICAL IMAGE STABILIZER

(71) Applicant: KAMAKURA KOKI CO., LTD., Saitama (JP)

(72) Inventors: Kunio Ando, Saitama (JP); Masashi Kato, Saitama (JP); Haruo Itoh, Kanagawa (JP); Kazuya Miyaji, Saitama (JP)

(73) Assignee: KAMAKURA KOKI CO., LTD., Saitama (JP)

( * ) Notice: Subject to any disclaimer, the term of this patent is extended or adjusted under 35 U.S.C. 154(b) by 171 days.

(21) Appl. No.: 14/258,807

(22) Filed: Apr. 22, 2014

(65) Prior Publication Data

US 2014/0320962 A1 Oct. 30, 2014

(30) Foreign Application Priority Data

Apr. 24, 2013 (JP) .................................. 2013-091233
Oct. 16, 2013 (JP) .................................. 2013-215372
Feb. 28, 2014 (JP) .................................. 2014-037629

(51) Int. Cl.
*G02B 27/64* (2006.01)
*G02B 23/18* (2006.01)
*G02B 23/02* (2006.01)

(52) U.S. Cl.
CPC .............. *G02B 27/646* (2013.01); *G02B 23/02* (2013.01)

(58) Field of Classification Search
CPC .................... G02B 23/00–23/02; G02B 27/64; G02B 27/646; G02B 27/648
See application file for complete search history.

(56) References Cited

U.S. PATENT DOCUMENTS

| 4,235,506 | A | 11/1980 | Saito et al. |
| 5,122,908 | A * | 6/1992 | Sporer ................. G02B 27/644 359/554 |
| 5,852,749 | A | 12/1998 | Konno et al. |
| 5,978,137 | A | 11/1999 | Takahashi et al. |
| 8,063,940 | B2 | 11/2011 | Stavely et al. |

(Continued)

FOREIGN PATENT DOCUMENTS

| DE | WO 2013104594 A1 * | 7/2013 | ............ F16F 15/035 |
| JP | 4104666 | 4/1992 | |

(Continued)

OTHER PUBLICATIONS

European Search Report (14001464.8, dated Oct. 14, 2014) (3 pages).

*Primary Examiner* — Thomas K Pham
*Assistant Examiner* — Cara Rakowski
(74) *Attorney, Agent, or Firm* — The Maxham Firm (57) ABSTRACT

An optical image stabilizer for a telescopic instrument having an objective lens, an erect prism, and an eyepiece lens arranged in this order which is capable of compensating for image deteriorations of an observed image due to external vibrations. The optical image stabilizer has a gimbal device mounted on a telescope housing, an external gimbal frame rotatably mounted on the gimbal casing, and an internal gimbal frame with the erect prism fixed thereto. Voice coil motors are provided for rotating the external and the internal gimbal frames. One of the voice coil motors has a coil disposed on the circuit board and a permanent magnet disposed on either one of the external and the internal gimbal frames oppositely to the coil. The remaining voice coil motor has a coil disposed on the circuit board and a permanent magnet disposed on the other gimbal frame oppositely to the coil.

19 Claims, 8 Drawing Sheets

(56) References Cited

U.S. PATENT DOCUMENTS 8,089,694 B2 1/2012 Wernersson
2009/0225177 A1* 9/2009 Maeda ................. G02B 27/646
　　　　　　　　　　　　　　　　　　　　　348/208.99
2013/0293956 A1* 11/2013 Dobermann ........... G02B 27/64
　　　　　　　　　　　　　　　　　　　　　359/480
2014/0320963 A1* 10/2014 Dobermann .......... F16F 15/035
　　　　　　　　　　　　　　　　　　　　　359/557

FOREIGN PATENT DOCUMENTS

| JP | 06250100 | 9/1994 |
| JP | 07043645 | 2/1995 |
| JP | 7318866 | 12/1995 |
| JP | 10020213 | 1/1998 |

* cited by examiner

OPTICAL IMAGE STABILIZER

FIELD OF INVENTION

The present apparatus relates generally to telescopic optical instruments and more particularly to an optical image stabilizer for instruments, such as monocular and binocular devices.

BACKGROUND OF THE INVENTION

When holding a telescopic optical instrument, as typified by a monocular device or binoculars, with hands, and operating it to make observations of an object and, in particular, when operating a hand-held telescopic optical instrument in a flying aircraft or a moving vehicle, the instrument encounters hand-shakings arising from vibrations (oscillating angular displacements or motions of the longitudinal axis of an aircraft or a vehicle due to yawing and pitching) of the flying aircraft or the moving vehicle imparted to a housing of the optical instrument. Such the hand-shakings cause the telescopic optical instrument to develop fluctuations in the angle of a beam of light emanating from the object under observation relative to an optical axis of the optical system of the optical instrument (which is hereinafter referred to as the "telescopic optical system"), resulting in deteriorations in the quality of an optical image of the object under observation. These deteriorations may include at least blurring of the telescopic optical image, or image-shakings (shakings of an image responding to hand-shakings which means vibrations of the hand-held telescopic optical instrument), and aggravation of resolution of the optical images, among others. Even if vibrations imparted or applied to the optical instrument are small in amplitude, measurable deteriorations are induced in the quality of an optical image of an object under observation because that the optical instrument, in the case of monocular or binocular devices, has only a narrow field of view and that an image formed by an objective lens is magnified through an eyepiece lens.

Conventionally, there has been proposed various optical image stabilizers to compensate for deteriorations in the quality of a telescopic optical image of an object under observation due to hand-shakings.

An example of optical image stabilizers of conventional telescopic optical instruments with a function of compensating for image-shakings is disclosed in the publication of published Japanese application No. 57-(1982)37852 (which corresponds to U.S. Pat. No. 4,235,506 now expired and is hereinafter referred to as Document I). This optical image stabilizer, which is of the form incorporated in binoculars having a pair of right and left telescopic optical systems, comprises a pair of right and left erect prisms each of which is disposed between an objective lens and an eyepiece lens of each telescopic optical system of the binoculars, a single prism holder frame for fixedly holding the right and left erect prisms, a gimbal device disposed axially between the pair of objective lenses and the pair of eyepiece lenses for suspending the prism holder frame for rotation about two axes orthogonally intersecting with each other in a plane perpendicular to optical axes of the telescopic optical systems, and a single gyro motor fixedly attached to the gimbal device.

The optical image stabilizer is functional in that a driving mechanism for the gimbal device can be rendered structurally simple by virtue of such constitution that the single gyro motor drives the gimbal device suspending the single prism holder frame with the pair of right and left erect prisms fixedly held thereby.

Incidentally, when dealing with lateral or horizontal vibrations of the binoculars (oscillating angular displacements or motions of the longitudinal axis of the binoculars due to yawing), the conventional optical image stabilizer installed in the binoculars disclosed in Document I causes rotation of the prism holder frame about one of two orthogonally intersecting axes of rotation, namely the vertical axis of ration, centrally located at a point of intersection between the right and the left telescopic optical system. In this instance, the erect prism of, for example, the left telescopic optical system is displaced in axial position toward the object side lens and the erect prism of the right telescopic optical system is displaced in axial position toward the image side, so that the distance between the erect prism and the objective lens becomes different between the right and the left telescopic optical system. This results in that the telescopic optical image becomes different in visual appearance between the right and the left optical systems. In other words, the optical image stabilizer of Document I has the result that, as the respective telescopic optical systems are rendered disconformable in physical relationship among their optical components when the optical image stabilizer reacts to deal with horizontal vibrations or motions, telescopic optical images respectively viewed through the telescopic optical systems are visually differently from each other.

Another image stabilizing optical device for a telescope, which is disclosed in published Japanese application No. 6(1994)-250100 (which is hereinafter referred to as Document II) is structurally similar to that of Document I with the exception that a gimbal device with a pair of right and left erect prisms retained by a single prism holder frame is servo-controlled to rotate and return to a specified state or an initial state so as thereby to compensate for deteriorations of a telescopic optical image, such as image-shakings, responding to vibrations imparted to the optical instrument. This angular velocity detection means mounted on the prism holder frame detects in the form of information on a rotational angle of the gimbal device relative to an inertial space arising due to the vibrations. As this optical image stabilizer is provided, in place of a gyro motor for a gimbal actuator, with a drive mechanism which comprises a rotary motor for rotating pivot shafts of the gimbal device and position detector means such as a potentiometer for detecting an angle of rotation of the gimbal device, the optical image stabilizer is ensured to be miniaturized, weight-saved, and need little electricity to work.

At the same time, although the optical image stabilizer disclosed in Document II has an effect on miniaturizing the telescopic optical systems of the binoculars which has a pair of erect prisms, nevertheless, since the rotary motor for rotating gimbal shafts and the potentiometer need a relatively large space for installation, the optical image stabilizer is hardly suitable for miniaturization of a monocular having a single erect prism in its telescopic optical system.

A telescopic observation optical instrument in the form of binoculars disclosed in published Japanese application No. 7(1995)-43645 (which is hereinafter referred to as Document III) comprises a pair of right and left variable apex angle prisms, each of which is disposed between an objective lens and an eyepiece lens of the respective telescopic optical system. It also has a vibration detector sensor for detecting vibrations of a body of the telescopic optical instrument, a pair of actuators for actuating the variable apex angle prisms, respectively, and a control circuit for determining the amount of motion according to the detected vibration.

Binoculars with a function of compensating for deteriorations of a telescopic optical image, such as image-shaking, is disclosed in published Japanese application No. 10(1998)-20213 (which is hereinafter referred to as Document IV). This apparatus comprises a pair of right and left correction lens, each disposed between an objective lens and an eyepiece lens of each of a pair of right and left telescopic optical systems, a vibration detector sensor for detecting vibrations of a body of the binoculars, an actuator for actuating the correction lenses at once and a control circuit for determining the amount of motion according to the detected vibrations.

The optical image stabilizers disclosed in Document I or II has the advantage of covering a wide range of practical application and, however, has limits to miniaturization and weight saving. Further, the optical image stabilizers disclosed in Document III or IV has the advantage of being rendered small in mechanism and, however, is disadvantageously limited in availability because of a small range of correctable vibrations.

SUMMARY OF EMBODIMENTS OF THE INVENTION

It is a purpose of the present apparatus to provide an optical image stabilizer for a telescopic optical instrument, typified by monocular devices and binoculars, having a telescopic optical system with an erect prism which is mounted on miniaturized, weight-saved, and inexpensively constituted gimbal means in a position between an objective lens and an eyepiece lens. This enables the structure to be capable of rotating on two axes of rotation orthogonal to each other and intersecting with an optical axis of the telescopic optical system at a right angle, thereby compensating for deteriorations in the quality of a telescopic optical image induced by horizontal vibrations which may be caused by vibrations of the vehicle (automobile, aircraft, or boat, for example) in which the user is riding, or even by unsteady hands of the user.

The above purpose is accomplished by an optical image stabilizer for telescopic optical instruments of the types discussed herein, which have a telescopic optical system made up of an objective lens, an erect prism, and an eyepiece lens arranged in this order: and mounted on a telescope housing. The optical system also has gimbal means mounting the erect prism thereon so that the erect prism is capable of rotating on orthogonal first and second axes of rotation intersecting on an optical axis of the telescopic optical system at a common point in order to compensate for deteriorations of a telescopic optical image resulting from externally generated vibrations. The gimbal means comprises a gimbal casing fixedly mounted on the telescope housing, an external gimbal frame rotatably mounted on the gimbal casing so as to rotate on the first axis of rotation, and an internal gimbal frame rotatably mounted on the external gimbal frame so as to rotate on the second axis of rotation and fixedly mounting the erect prism thereon. The gimbal means is further provided with a pair of voice coil motors for actuating the external gimbal frame and the internal gimbal frame on the first and the second axis of rotation, respectively. Each voice coil motor comprises first yoke means which has a permanent magnet and second yoke means which has a loop-shaped coil with an empty space therein, and a position detector element disposed in the empty space of the loop-shaped coil for providing a position signal indicating a position of the loop-shaped coil relative to the permanent magnet, and a circuit board having a drive circuit for actuating the voice coil motor and fixedly mounted on the external gimbal frame.

The voice coil motor is characterized in configuration in that, the second yoke means of the respective voice coil motor is mounted on the circuit board, the first yoke means of the voice coil motor for the external gimbal frame is mounted on the gimbal casing opposite to the second yoke means of the voice coil motor for the external gimbal frame and the first yoke means of the voice coil motor for the internal gimbal frame is mounted on the internal gimbal frame opposite to the second yoke means of the voice coil motor for the internal gimbal frame. The permanent magnet of the first yoke means and the loop-shaped coil of the second yoke means are preferably spaced opposite to each other with a specified distance. According to alternative embodiment of the present apparatus, the optical image stabilizer is further provided with an angular velocity detector for providing an angular velocity signal indicating an angular displacement of the erect prism caused due to external vibrations for drive control of the voice coil motor. The signal from the position detector element of the respective voice coil motor which primarily indicates a position of the loop-shaped coil relative to the permanent magnet is differentiated to provide the drive circuit with an angular velocity signal indicating an angular displacement of the erect prism caused by external vibrations in order to execute drive control of the voice coil motor. The drive circuit drives the voice coil motors so as to control rotation of the external and internal gimbal frames of the gimbal means according to the position signal and the angular velocity signal, thereby retaining the gimbal means in an initial state wherein the erect prism is remained in position before encountering external vibrations.

The optical image stabilizer of this concept is capable of compensating for deteriorations in the quality of a telescopic optical image, that is, an observed image, which result from hand-shakings generated by external vibrations imparted to a hand-held telescopic optical instrument. In addition to this, this optical image stabilizer is less subject to the degree of design freedom resulting from the gimbal drive means which is simplified and miniaturized in mechanism and produced at a reduced cost. Particularly, this optical image stabilizer is available in a broad field of telescopic optical instruments such as laser ranging devices as well as monocular devices and binoculars.

BRIEF DESCRIPTION OF THE DRAWINGS

The above and other objects and features of the present apparatus will clearly understood from the following detailed description when considered in conjunction with the accompanying drawing, in which:

FIG. 1(*a*) is a schematic illustration showing a monocular device as a telescopic optical instrument in which an optical image stabilizer in accordance with an embodiment of the present apparatus is incorporated;

FIG. 1(*b*) is a schematic illustration showing the basic principle of the optical image stabilizer of the apparatus of FIG. 1(*a*);

FIG. 3(*a*) is a schematic top plan view of a basic structure of a voice coil motor generally known;

FIG. 3(*b*) is a schematic cross sectional view showing the voice coil motor taken along a line A-A in FIG. 3(*a*);

FIG. 3(*c*) is a top plan view showing a permanent magnet to be incorporated in the voice coil motor of FIG. 3(*b*);

FIG. 3(*d*) is a cross sectional view of the permanent magnet shown in FIG. 3(*c*);

DETAILED DESCRIPTION OF EMBODIMENTS OF THE INVENTION

Figure 1A:
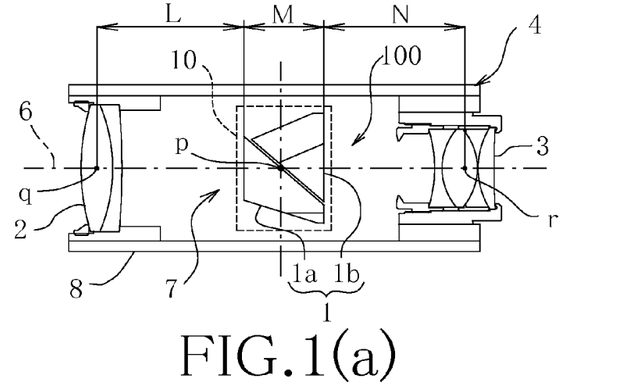
Figure 1B:
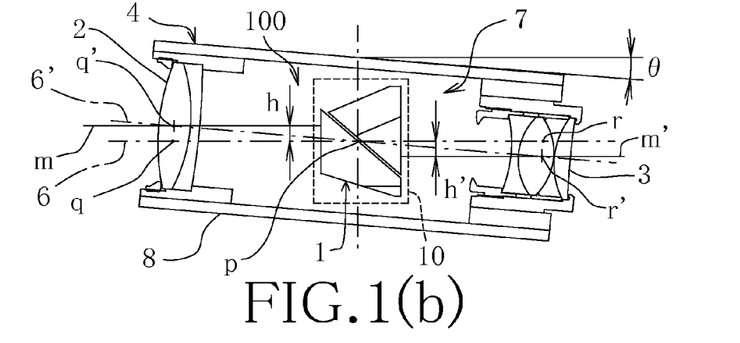

FIGS. 1(a) and 1(b) show an optical image stabilizer 100 according a preferred embodiment of the present device which is incorporated in monocular device 4, presented here as an example of a telescopic optical instrument. As shown in FIG. 1(a), the monocular device comprises housing 8 and telescopic optical system 7 having optical axis 6 incorporated in the housing. Optical system 7 is constituted by stationary objective lens 2, movable eyepiece lens 3, and erect prism 1 united with gimbal means 10 disposed between and coaxially with the objective lens and the eyepiece lens. As will be described in detail later with reference to FIGS. 5(a) and 5(b), the gimbal means includes an internal frame on which erect prism 1 is mounted. Monocular device 4, thus provided with gimbal means 10, is constituted so as to retain erect prism 1 in the same primary or initial state (as shown in FIG. 1(a)) that it had before being affected by hand-shakings, even when the monocular device encounters hand-shakings arising from vibrations, for example, oscillating angular displacements or motions of the longitudinal axis (that is, optical axis 6') due to yawing and pitching as shown in FIG. 1(b).

Figure 2:
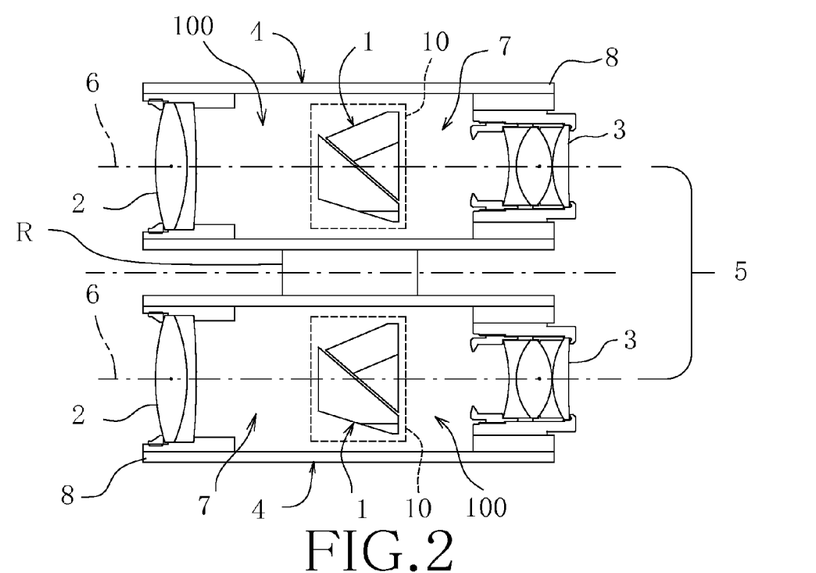
FIG. 2 is a schematic illustration showing binoculars as a telescopic optical instrument in which an optical image stabilizer in accordance with an embodiment of the present apparatus is incorporated.

FIG. 2 shows optical image stabilizer 100 according to an alternative embodiment which is incorporated in binoculars 5 as another example of a telescopic optical instrument. As shown, the binoculars comprise a pair of the monocular devices 4 shown in FIG. 1(a) which are interconnected by means of coupling means R in such a configuration that the optical axes 6 of the respective telescopic optical systems 7 are parallel with each other.

Figure 4A:
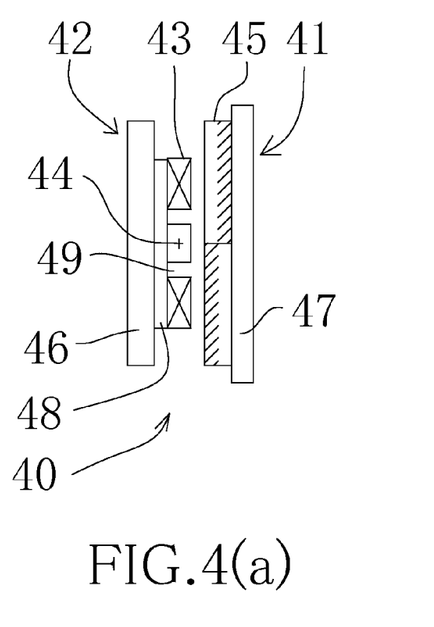
FIG. 4(a) is a schematic cross sectional view showing a split type voice coil motor to be incorporated into the optical image stabilizer of the present concept.
Figure 4B:
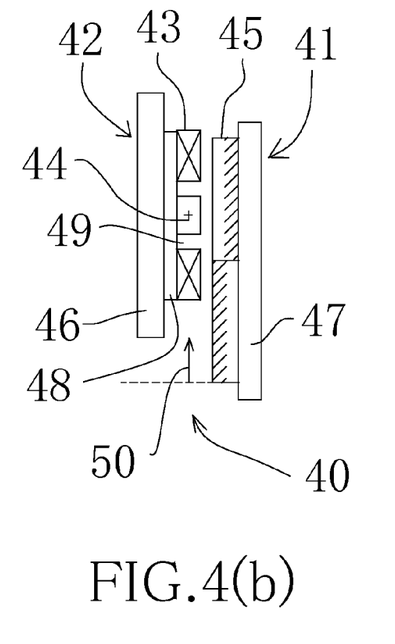
FIG. 4(b) is a schematic cross sectional view showing the voice coil motor of FIG. 4(a) in an activated state in which a coil is moved relatively a permanent magnet.
Figure 5A:
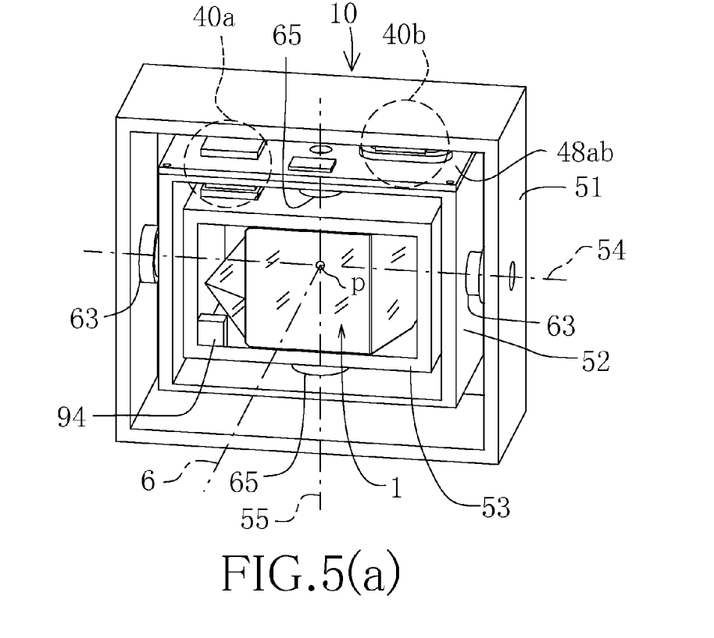
FIG. 5(a) is a schematic perspective view showing a gimbal structure which is incorporated in the optical image stabilizer of the apparatus of FIG. 1(a)

As the optical image stabilizer of the present concept, which is well suited for monoculars devices and binoculars, has the identical image stabilizer optical system applied to the monocular device shown in FIG. 1(a) or to the binoculars shown in FIG. 2, the following detailed description is given taking the optical image stabilizer 100 of the monocular device, for instance, with reference to FIGS. 4, 5(a) and 1(b).

Optical image stabilizer 100 is provided with two units of voice coil motors 40a and 40b (FIGS, 5(a) and 5(b)) serving as drive means for driving gimbal means 10 with erect prism 1 mounted thereon for compensation for deteriorations of a telescopic optical image or an observed image which is induced by vibratory motions or shaking motions applied to housing 8 of monocular device 4. As will be described later, voice coil motors 40a, 40b have first yoke members 47a, 47b in the form of a flat rectangular plate and second yoke members 46a, 46b in the form of a flat rectangular plate which are split from and oppositely spaced apart from each other. The second yoke members are provided with hollow or loop-shaped coils 43a, 43b with position detector elements 44a, 44b disposed in empty space 49 (see FIG. 4) thereof. The position detector elements may be magnetically sensitive devices such as Fall effect elements. First yoke members 47a, 47b are provided with square-plate permanent magnets 45a, 45b configured analogously to the example shown in FIGS. 3(c) and 3(d) These first and second yoke members 46a and 47a, 46b and 47b, are disposed in opposite positions at a prescribed distance therebetween and configured so as to be relatively movable.

Various types of erect prisms including, for example, a Schmidt erect prism or an Abbe erect prism, among others, can be employed. In FIGS. 1(a) and 1(b), the Schmidt erect prism is shown as the erect prism.

Figure 5B:
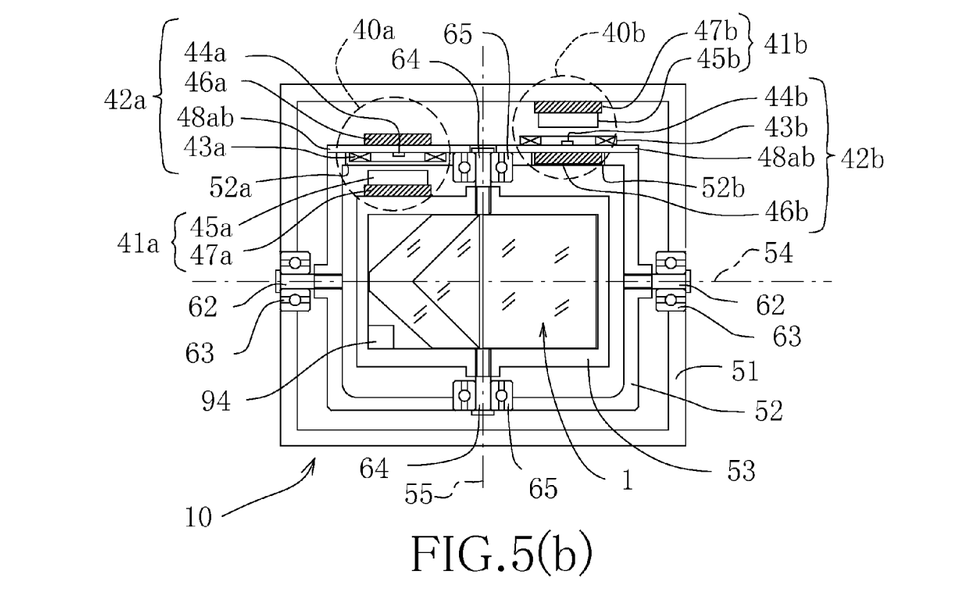
FIG. 5(b) is a front elevational view showing the gimbal of FIG. 5(a)

As shown in FIGS. 5(a) and 5(b), gimbal means 10 (shown in FIG. 1(a)) has two axes of rotation perpendicularly intersecting each other. These are first axis of rotation 54 extending in a horizontal direction and second axis of rotation 55 extending in a vertical direction, both intersecting optical axis 6 of optical system 7 of the monocular device at right angles. As clearly shown in FIGS. 1(a) and 5(a), intersection point p, at which the horizontal first and vertical second axes of rotation 54 and 55 intersect optical axis 6 at right angles, is a middle point of the total length S (not specifically called out in FIG. 1(a)) of a combined optical path of length L from objective lens 2 to an incidence surface of erect prism 1, mechanical length M between the incidence surface and an exit surface of the erect prism, and an optical of path length N from the exit surface of the erect prism to eyepiece lens 3 (S=L+M+N). Since it is practically quite usual that either one of the objective lens 2 and the eyepiece lens 3 is made up of a plurality of component lens elements having thickness, the intersection point p is at a middle point of the total length of the optical path S from a rear or image side principal point of objective lens 2 to a front or object side principal point of the eyepiece lens 3. The objective lens 2 and the eyepiece lens 3 are hereinafter explained in the form of a thin lens system.

The basic principle of optical image stabilizer 100 will be explained with reference to FIG. 1(b). When the monocular device, shown in an initial state in FIG. 1(a), alters its position into an inclined state wherein housing 8 inclines at, for example, an angle of θ as shown in FIG. 1(b), which can result from an application of vibrations, to the housing in the initial state, objective lens 2 and eyepiece lens 3, which are mechanically united with housing 8, change their position to the inclined state concurrently with the inclining of the optical axis 6 (the optical axis in the inclined state is denoted by a reference 6'). Then, in the case wherein erect prism 1 of gimbal means 10 is controlled so as to remain in the same orientation as in the initial state, a ray of incident light m passing through a center q' of the objective lens in the inclined state and traveling parallel with the optical axis 6 in the initial state just before the inclining of housing 8 at an angle θ, enters the erect prism along an axial line laterally shifted by a distance h which is parallel with optical axis 6 in the initial state. By virtue of the optical property of erect prism 1 that an optical axis of incident light and an optical axis of exit light (an incident optical axis and an exit optical axis) are collinearly aligned with each other, the ray of incident light m exits a ray of exit light m' from erect prism 1 along an axial line laterally shifted on an opposite side by a distance h' which is parallel with optical axis 6 in the initial state and then passing through eyepiece lens 3 at its center r' in the inclined state. Consequently, since the outgoing ray of light m' passing through the eyepiece lens 3 at the center r' in the inclined state travels parallel with optical axis 6 in the initial state just before encountering vibrations, monocular device 4 is capable of providing an unshaken and distinct image even when encountering or being affected by vibrations.

Although the description in connection with FIG. 1(*b*) is provided in the case where the axes of rotation of gimbal means 10 are set up at the center p of erect prism 1 in the axial direction, the erect prism may be axially displaced from the first and second axes of rotation 54 and 55 as long as the intersection point p at which the first and vertical second axes of rotation intersect optical axis 6 satisfies the geometric condition described above.

In the prior art, a combination of a rotary type drive motor for rotating rotary shafts from which the gimbal device is suspended and a position detector means such as a potentiometer are employed for the gimbal driving device. However, the rotary shaft driving motor is relatively large in terms of shape as compared with gimbal frames of the gimbal device and is bound by an installation location and dimensional features such as diameter and thickness. This, thereby, imposes restrictions on miniaturization and weight saving of the optical image stabilizer.

By contrast with the gimbal driving device of the conventional optical image stabilizer, a voice coil motor is employed as the gimbal driving device in optical mage stabilizer 100. This voice coil motor 40, as shown in FIGS. 4(*a*), 4(*b*), and 5(*b*), comprises members 46, 47 in the form of relatively thin rectangular flat plates, either one of which is provided with position detector element 44 incorporated in space 49 of loop-shaped coil 43. The voice coil motor thus constituted provides broad options of installation locations, so as thereby to increase the degree of design freedom and, in consequence, to allow for a smaller and lighter optical image stabilizer.

The following description is directed to a conventional voice coil motor 30 shown in FIGS. 3(*a*) to 3(*d*) in order to provide a clear and easy understanding of the distinctive structure of the voice coil motor 40 (40*a*, 40*b*) employed in optical image stabilizer 100.

Figure 3A:
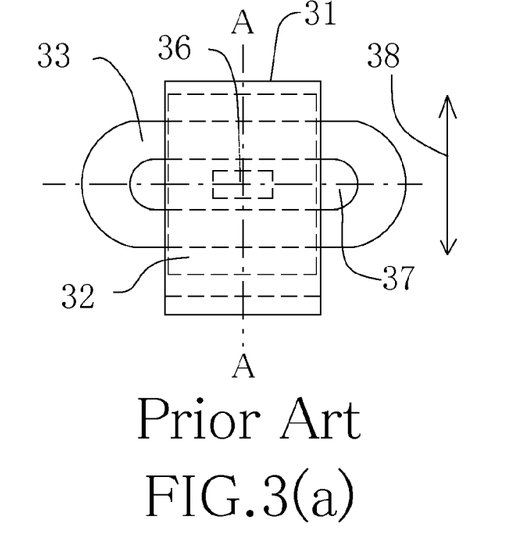
Figure 3B:
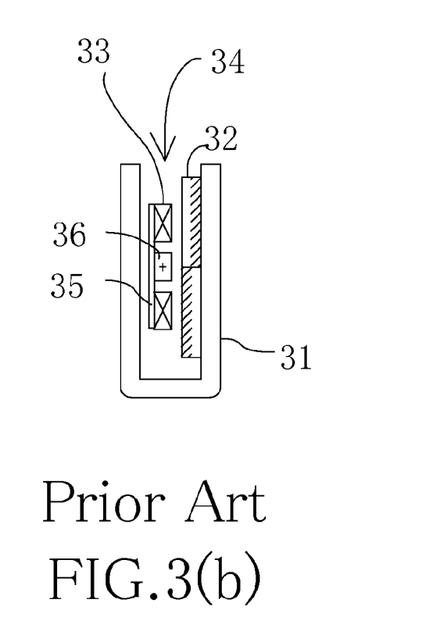
Figure 3C:
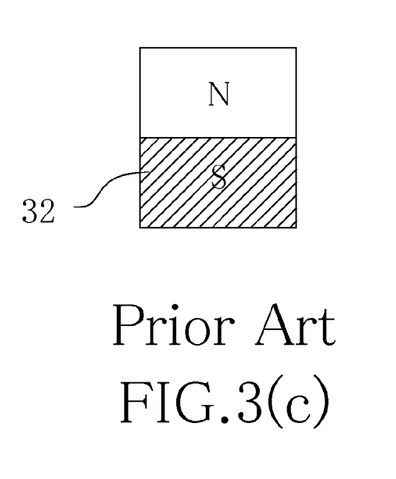
Figure 3D:
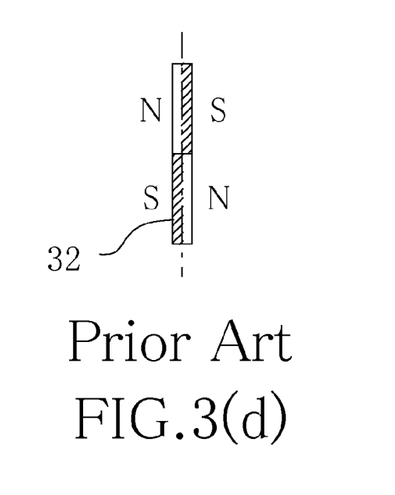

Voice coil motor 30 comprises stationary yoke member 31 in the form of U-shaped iron core with empty space 34 defined between the opposed inner faces of the stationary yoke member. Permanent magnet 32 is mounted on one of the opposed inner faces of the stationary yoke member and loop-shaped coil 33 is formed with empty space 37 mounted on carrier board 35. The carrier board may be used in common with, for instance, a printed circuit board and movably disposed in space 34 of the stationary yoke member 31. Position detector element 36 is shown mounted on the carrier board at a center in space 34 of coil 33. As specifically illustrated in FIGS. 3(*c*) and 3(*d*), permanent magnet 32 is made up of a square-plate of powerful permanent magnet and is spatially divided into two halves bounded by a center line. The two halves are perpendicularly magnetized reversely in polarity in the direction of thickness so as to have reverse polarities, namely an S magnetic polarity (shaded in the drawings) and an N magnetic polarity. In order to assist in understanding the following description, those magnetized in the S magnetic polarity are shaded throughout the drawing figures. This arrangement of permanent magnet 32 mounted on one of the inner faces of stationary yoke member 31, as shown in FIG. 3(*a*), develops a magnetic field in space 34 of the yoke member which is perpendicular to the opposite inner faces of the stationary yoke member and is reversed in direction when loop-shaped coil 33 moves crossing the boundary center line of permanent magnet 32. Therefore, when applying an electric current through coil 33, which is movably disposed in space 34 of the yoke member with the magnetic field thus developed, coil 33 is forced to move in either direction indicated by arrow 38, depending on the direction of current flow. Consequently, when linking an object member to be moved (not shown) with carrier board 35, voice coil motor 30 is capable of making a linear motion of the object member.

Further, since having position detector element 36 such as, for instance, a Hall effect element or a magnetically sensitive element like a magnet-resistive element, which is disposed in the space 34 of coil 36, voice coil motor 30 is capable of providing a position signal indicating a moved position of the loop-shaped coil. If disposing voice coil motor 30 so that position detector element 36 falls on the boundary between the N magnetic polarity and the S magnetic polarity of permanent magnet 32, the position detector element provides an output of zero. This constitutional arrangement is quite useful for setting of an initial reference position of the voice coil motor in the initial state.

Referring to FIGS. 4(*a*) and 4(*b*), voice coil motor 40 of the present apparatus is characterized by separated movable yoke means in place of the conventional U-shaped stationary yoke member. The voice coil motor has first yoke means 41, including a permanent magnet 45, and second yoke means 42, including loop-shaped coil 43 and position detector element 44 such as, for instance, a magnetically sensitive element like a Hall effect element. More specifically, first yoke means 41 includes permanent magnet 45 and first yoke member 47 in the form of a relatively thin rectangular flat plate on which permanent magnet 45 is fixedly mounted. Yoke means 41 is similar in magnetic structure and function to the permanent magnet used in the conventional voice coil motor shown in FIGS. 3(*a*) through 3(*d*). Second yoke means 42 comprises loop-shaped coil 43 formed with space 49, position detector element 44 positioned at a center of space 49, carrier board 48 on which the loop-shaped coil 43 and the position detector element are fixedly mounted, and second yoke member 46 in the form of a relatively thin rectangular flat plate to which carrier board 48 is fixedly attached. The first and second yoke means are spaced with a specified air space therebetween and capable of making relative displacement to each other. In the case where first yoke means 41 is stationary or is a stator, for instance, second yoke means 42, which works together with coil 43 as a movable body, moves relative to the first yoke means in the direction indicated by arrow 50 in FIG. 4(*b*) when applying an electric current through coil 43. In reverse, in the case where second yoke means 42 is stationary or is a stator, first yoke means 41 with permanent magnet coil 43 moves as a movable body relatively to the second yoke means.

Referring to FIGS. 5(*a*) and 5(*b*), gimbal means 10 comprises gimbal casing 51 in the form of a generally square frame through which the gimbal means is fixedly received in monocular housing 8. The gimbal means also includes external gimbal frame 52, which is similar in shape to gimbal casing 51, and internal gimbal frame 53, similar in shape to the gimbal casing. Gimbal casing 51 and gimbal frames 52 and 53 may be an integral frame made up of top and bottom cross members and right and left side members. Internal gimbal frame 53 fixedly mounts erect prism 1 therein. External gimbal frame 52 is rotatably mounted to gimbal casing 51 by means of shafts 62 on the external gimbal frame and bearings 63 in the gimbal casing. This structure provides first or horizontal axis of rotation 54 perpendicular to optical axis 6 in the horizontal direction. Internal gimbal frame 53 is rotatably mounted to external gimbal frame 52 by means of shafts 64 on the internal gimbal frame and bearings 65 secured in the external gimbal frame. This structure provides vertical or second axis of rotation 55 perpendicular to both monocular optical axis 6 and horizontal first axis of rotation 54.

Figure 6A:
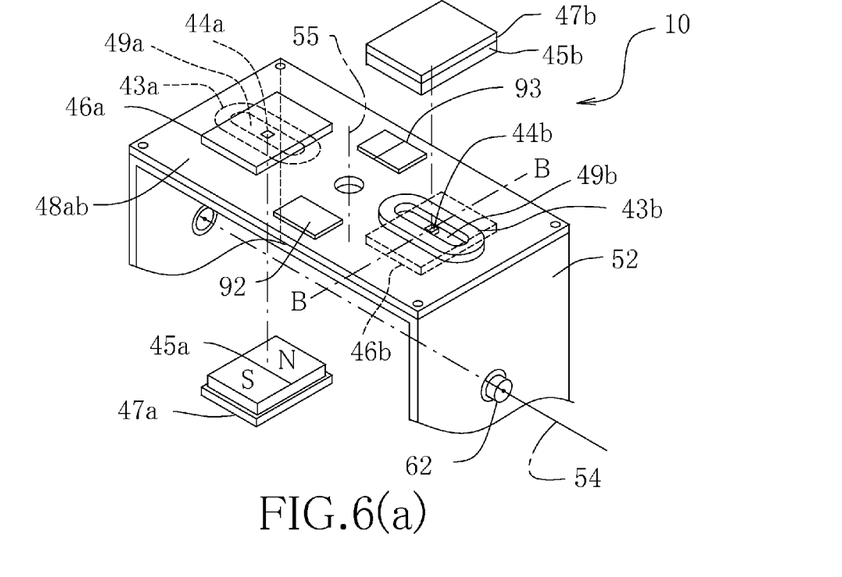
FIG. 6(a) is an expanded perspective illustration showing a partial structure surrounding a circuit board for the voice coil motor of this apparatus.

Gimbal means 10 further comprises two voice coil motor units, namely, first voice coil motor unit 40*b* for activating external gimbal frame 52 and second voice coil motor unit 40*a* for activating internal gimbal frame 53. The gimbal means also includes circuit board 48*ab* with first and second motor driver circuits 93 (see FIG. 6(*a*)) printed thereon for driving and controlling the first and second voice coil motor units 40*b* and 40*a*, respectively. The circuit board 48*ab* is fixedly attached to an outer surface of a top cross member of external gimbal frame 52 and the first and second voice coil motor units 40*b* and 40*a* are partly mounted thereon, as will be described below.

First voice coil motor unit 40*b* is made up of first yoke means 41*b* as a stator comprising permanent magnet 45*b* and a first yoke member 47*b* on which permanent magnet 45*b* is fixedly mounted, and second yoke means 42*b* as a movable body comprising second yoke member 46*b*, loop-shaped coil 43*b* with elliptical empty space 49*b*, and position detector element 44*b* positioned in space 49*b* of coil 43*b*. The first yoke means and the second yoke means are separately arranged oppositely between gimbal casing 51 and external gimbal frame 52, spaced by a predetermined air space or distance.

Similarly, second voice coil motor unit 40*a* is made up of first yoke means 41*a* as a stator comprising permanent magnet 45*a* and first yoke member 47*a* on which permanent magnet 45*a* is fixedly mounted, and second yoke means 42*a* as a movable body comprising second yoke member 46*a*, loop-shaped coil 43*a* with an elliptical empty space 49 (see FIG. 4) and position detector element 44*a* positioned in space 49 of coil 43*a*. First yoke means 41*a* and second yoke means 42*a* are separately arranged oppositely between external gimbal frame 52 and internal frame 53, spaced by a predetermined air space or distance.

Permanent magnet 45*b* of first yoke means 41*b* of first voice coil motor unit 40*b* is mounted on first yoke member 47*b*, which is, in turn, mounted on the top cross member of gimbal casing 51. On the other hand, permanent magnet 45*a* of first yoke means 41*a* of second voice coil motor unit 46*a* is mounted on first yoke member 47*a*, which is, in turn, mounted on the top cross member of internal gimbal frame 53.

However, second yoke means 42*b* and 42*a* of the respective voice coil motor units 40*b* and 40*a* are fixedly mounted on circuit board 48*ab* at opposite sides. More specifically, loop-shaped coil 43*b* of second yoke means 42*b* of first voice coil motor unit 40*b* is positioned so as to face first yoke means 41*b* and is fixedly attached to circuit board 48*ab* at a face side opposed to gimbal casing 51. Position detector element 44*b* is positioned at the center of space 49*b* and also fixedly attached to circuit board 48*ab* at the face side. Second yoke member 46*b* of second yoke means 42*b* of first voice coil motor unit 40*b* is fixedly attached to circuit board 48*ab* at a back side and received in opening 52*b* formed in the top cross member of external gimbal frame 52.

On the other hand, loop-shaped coil 43*a* of second yoke means 42*a* of the second voice coil motor unit 40*a* is received in a second opening 52*a* formed in the top cross member of external gimbal frame 52 so as to face first yoke means 41*a* and is fixedly attached to circuit board 48*ab* at the back side. Position detector element 44*a* is positioned at the center of space 49 and is also fixedly attached to circuit board 48*ab* at the back side. Second yoke member 46*a* of second yoke means 42 of second voice coil motor unit 40*a* is fixedly attached to circuit board 48*ab* at the face side.

If it is needed to detect an angular displacement of internal gimbal frame 53, that is, erect prism 1, for servo-control of the gimbal means, it is preferred to provide internal gimbal frame 53 with angular velocity detector 94 for providing a signal indicating an angular displacement of internal gimbal frame 53, that is, erect prism 1, as shown in FIGS. 5(*a*) and 5(*b*).

It is to be noted that gimbal means 10, shown in FIGS. 5(*a*) and (*b*), may have two axes of rotation, namely, horizontal first axis of rotation 54 and vertical second axis of rotation 55, interchanged in direction with each other. In other words, gimbal means 10 may be installed in a position turned 90 degrees, without exerting any influence on the advantageous effects of the present optical image stabilizer.

A structural feature, is that respective second yoke means 42*a* and 42*b* of voice coil motor units 40*a* and 40*b* are commonly mounted on the circuit board 48*ab* which enables two coil assemblies, including the position detector element (Hall effect elements), to be incorporated into the circuit board together with various circuit components such as microcomputer 92 and first and second voice coil motor driver circuits 93 (see FIG. 6(*a*)).

Figure 6B:
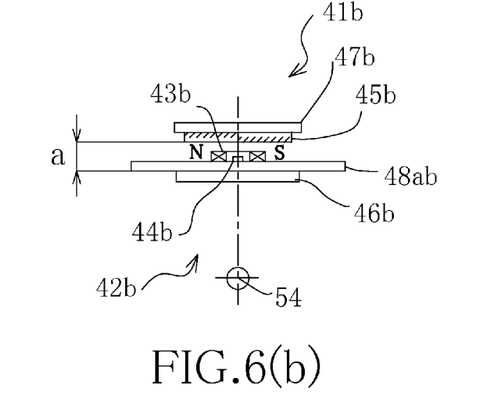
FIG. 6(b) is a schematic cross sectional illustration showing the voice coil motor in an initial state taken along a line B-B in FIG. 6(a)
Figure 6C:
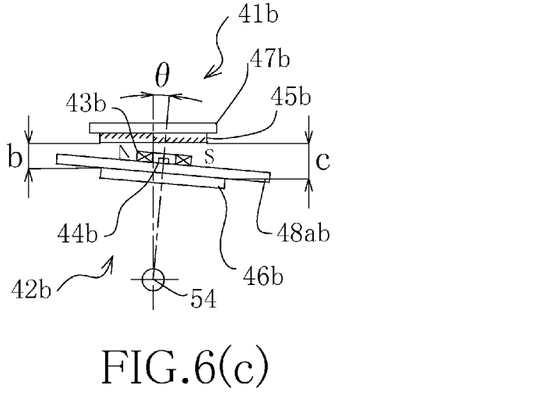
FIG. 6(c) is a schematic cross sectional illustration showing the voice coil motor of FIG. 6(b) in an inclined state.

The operation of voice coil motor units 40*a*, 40*b* of the optical image stabilizer of the present concept will be hereinafter described in detail with reference to FIGS. 5(*b*), 6(*a*), 6(*b*), and 6(*c*). FIG. 6(*a*) illustrates a partial structure surrounding circuit board 48*ab* of the voice coil motor units 40*a*, 40*b* in a perspective view, the first and second yoke means 41*a*, 42*a*, and 41*b*, 42*b* of each voice coil motor unit are spaced apart at a distance dimensionally exaggerated for easy explanation.

FIG. 6(*b*) is an explanatory partial cross-sectional view of circuit board 48*ab* with second yoke means 42*b* taken along a line B-B in FIG. 6(*a*). This shows that gimbal means 10 is servo-controlled and well stabilized in the initial state just before monocular device 4 (FIG. 1) encounters vibrations such as hand-shakings. Circuit board 48*ab* with second yoke means 42*b* is capable of rotating on the first axis of rotation 54 extending in the horizontal direction. FIG. 6(*c*) is an explanatory partial cross-sectional view of the circuit board 48*ab* with second yoke means 42*b* in which the gimbal means is in an inclined state. Here, external gimbal frame 52, and hence circuit board 48*ab* with coil 43*b* and position detector element 44*b*, is actuated to incline at an angle $\theta$ due to rapid, significant vibrations such as the vertical component of hand-shakings imparted to the monocular device. The possible inclination is small in angle, so that the first voice coil motor unit 40b, which causes rectilinear motion, does not run into problems in operation. Optical image stabilizer 100 is intended to provide a coverage for vibrations resulting from hand-shakings and the like within the bounds of about ±5°. External gimbal frame 52, and hence circuit board 48ab, is able to return into the initial state shown in FIG. 6(b) by means of giving a position signal from position detector element 44b to the coil 43b for position servo-control.

As is well known in the art, the attraction of a magnet acting on a yoke member is inversely proportional to a square of the distance therebetween. Because the distance between permanent magnet 45b and second yoke member 46b of second yoke means 42b becomes smaller from a in the initial state shown in FIG. 6(b) to b at the left hand end, the magnetic force acting on the second yoke member 46b becomes stronger. Contrary, because the distance between permanent magnet 45b and second yoke member 46b becomes larger from a in the initial state shown in FIG. 6(b) to c at the right hand end, the magnetic force acting on second yoke member 46b becomes weaker.

Figure 7A:
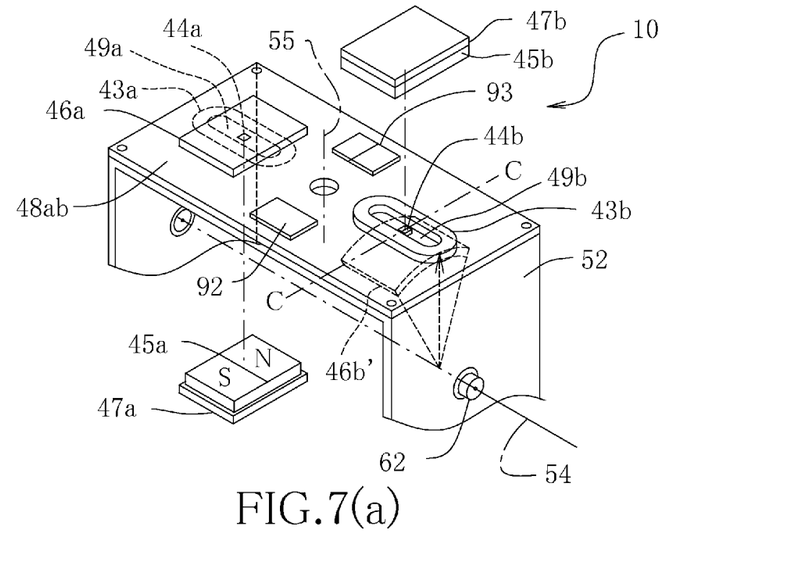
FIG. 7(a) is an expanded perspective illustration similar to FIG. 6(a) but showing a modified voice coil motor.
Figure 7B:
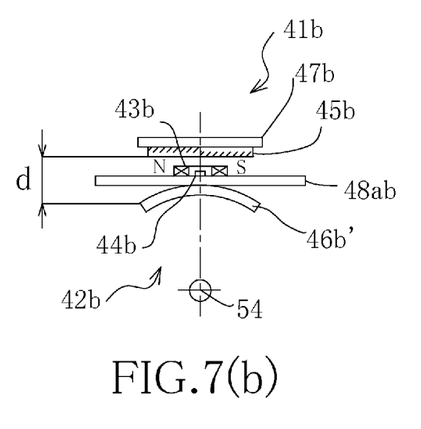
FIG. 7(b) is a schematic cross sectional illustration showing the modified voice coil motor in an initial state taken along a line C-C in FIG. 7(a)
Figure 7C:
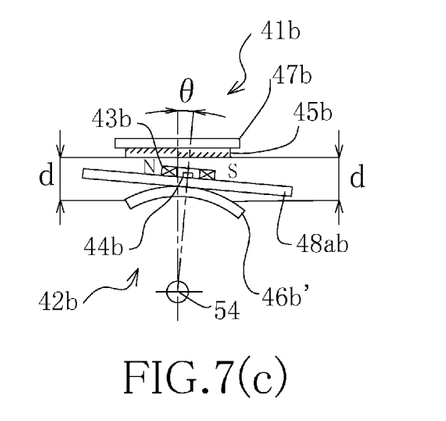
FIG. 7(c) is a schematic cross sectional illustration showing the voice coil motor of FIG. 7(b) in an inclined state.

FIGS. 7(a) to 7(c) illustrate a partial structure surrounding the circuit board in which the first voice coil motor is exactly similar to the first voice coil motor shown in FIGS. 5 and 6(a). A difference is that here second yoke member 46b, which is a relatively thin curved plate, is employed in place of second yoke member 46b which is formed as a relatively thin rectangular flat plate. This second yoke member is curved around a rotative direction and has a curved surface with a curvature radius R equal to a distance between the horizontal first axis of rotation 54 and the second yoke member 46b'. This curvature radius R is not required to be strictly defined and may be an approximate distance between rotation axis 54 and second yoke member 46b'. Second yoke member 46b' is not received in an opening of the top cross member of external gimbal frame 52 but is fixedly attached to the top surface of the top cross member of external gimbal frame.

Circuit board 48ab is shown in FIG. 7(b) with the second yoke means 42b shown in cross-section FIG. 6(b) for reference) along a line C-C in FIG. 7(a). Gimbal means 10 is servo-controlled and well stabilized in the initial state just before the monocular device encounters vibrations such as hand-shakings. When rapid, significant vibrations are imparted to the optical device, external gimbal frame 52, together with circuit board 48ab, coil 43b, and position detector element 44b, is actuated to an angle .theta. as shown in FIG. 7(c). However, in the inclined state, the distance d between permanent magnet 45b and the second yoke member 46b' remains unchanged at the right and left hand ends. Thus, the magnetic force acting on the second yoke member is constantly unchanged even when the external gimbal frame 52 and circuit board 48ab are inclined, thereby preventing uneven distribution of magnetic force. In consequence, gimbal means 10 is allowed to return to the initial state in a short time and coil 43b needs little electricity to function. In this instance, since optical image stabilizer 100 is intended to provide a coverage bar vibrations resulting from band-shakings and the like within the bounds of about .+−.5.degree., gimbal means 10 is able to return to the initial state shown in FIG. 7(b) in a short time by means of giving a position signal to coil 43b for position servo-control.

Figure 8A:
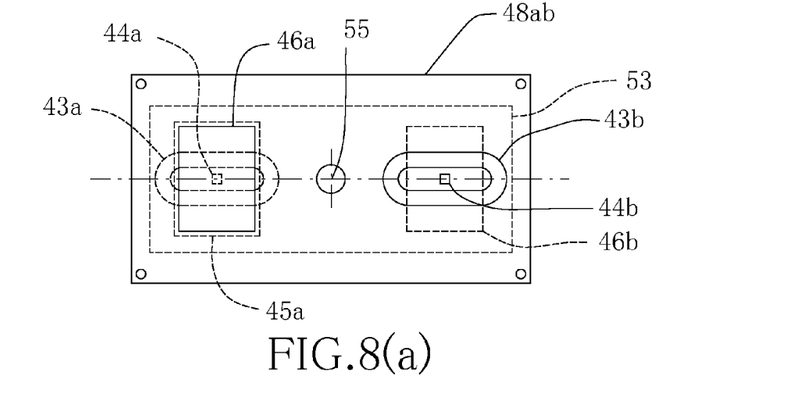
FIG. 8(a) is a schematic illustration showing the modified voice coil motor of FIG. 7(b) in the initial state.
Figure 8B:
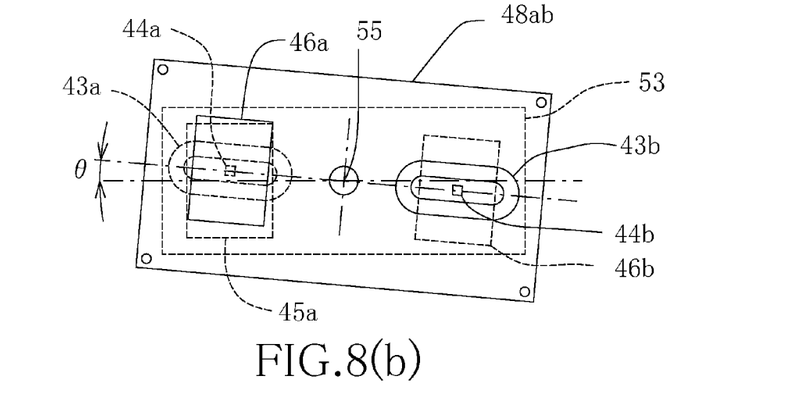
FIG. 8(b) is a schematic illustration showing the modified voice coil motor of FIG. 7(b) in an inclined state.

FIG. 8(a) is a plan view illustrating first and second voice coil motor units 40b and 40a of the optical device in the initial state before encountering vibrations. As seen, internal gimbal frame 53 (FIG. 5) is capable of rotating tin the second axis of rotation 55 extending in a vertical direction relatively to circuit board 48ab. FIG. 8(b) is a plan view showing the first and second voice coil motor units in the inclined state where external gimbal frame 52, with the circuit board, is forced to turn through or incline art angle .theta. relative to internal gimbal frame 53 in a horizontal direction due to horizontal vibrations. In common with first voice coil motor unit 40b, the second voice coil motor unit 40a, which causes rectilinear motion, does not run into problems in operation as the possible turn inclination is small in angle.

Since second voice coil motor unit 40a for driving internal gimbal frame 53 has the first yoke means mounting the coil assembly thereon as a stator, and the second yoke means mounting permanent magnet 45a thereon as a movable body, internal gimbal frame 53 with second yoke means turns or inclines on the vertical second axis of rotation 55 between the initial state shown in FIG. 8(a) and the inclined state shown in FIG. 8(b) when encountering vibrations. Even in this case, this optical image stabilizer is configured to provide a coverage for horizontal vibrations within the bounds of about ±5°, and internal gimbal frame 53 is able to return to the initial state shown in FIG. 8(a) by means of giving a position signal from the position detector element 44a to coil 43a as a position servo-control signal.

A position servo-control system for causing a required distance of displacement of the respective gimbal frame 52, 53 can be easily achieved by means of operating a target position of the gimbal frame for offsetting a displacement of gimbal frames 52, 53 based on positional information. Such positional information can be acquired from a Hall effect element as the position detector element with a microprocessor or microcomputer and then feeding back the calculated result as a control signal for a coil drive current of voice coil motor units 40a, 40b.

Figure 9:
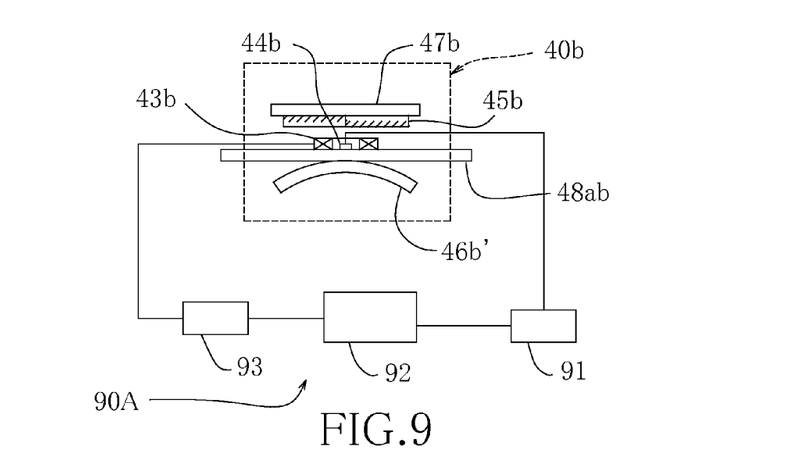
FIG. 9 is a block diagram showing an example of the drive circuit for the voice coil motor of the present apparatus.

FIG. 9 is a block diagram illustrating a voice coil motor drive controller 90A for the first voice coil motor unit 40b which constitutes a position servo system. As the first and second voice coil motor units 40b and 40a are basically identical in structure and operation, the following description is directed to the voice coil motor drive controller 90A for first voice coil motor unit 40b only. The voice coil motor drive controller is provided with positional signal amplifier circuit 91, microcomputer 92, and a driver circuit 93. A positional signal from the position detector element 44b incorporated in the second voice coil motor 40b is sent to the microcomputer through positional signal amplifier circuit 91. The microcomputer performs a phase compensation tilter operation, and provides gain adjustment and setting of a target position for offsetting of a displacement of external and internal gimbal frame 52 and 53. The microcomputer thereafter operates a voice coil motor control signal for feedback driving the voice coil motor for position servo control. Position signal amplifier circuit 91 amplifies the voice coil motor control signal with which the driver circuit drives voice coil motor 40b.

Figure 10:
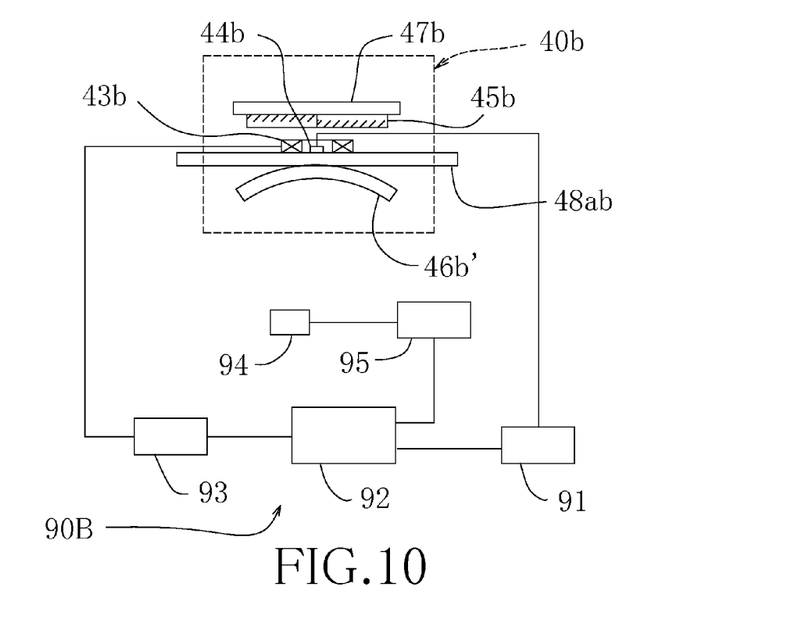
FIG. 10 is a block diagram showing another example of the drive circuit for the voice coil motor of the present apparatus.

FIG. 10 is a block diagram illustrating alternative voice coil motor drive controller 90B for first voice coil motor unit 40b. Voice coil motor drive controller 90B is additionally provided with angular velocity detector 94 and signal amplifier circuit 95. Angular velocity detector 94 is mounted on internal gimbal frame 53, which has erect prism 1 thereon, to exactly detect a motion of gimbal means 10. Signal amplifier circuit 95 amplifies an angular velocity signal from the angular velocity detector and sends it out to the microcomputer 92 for operation of a voice coil motor control signal which is finally sent to driver circuit 93 after amplification for voice coil motor control. The angular velocity signal from angular velocity detector 94 is used to provide a target position of gimbal frame for offsetting a displacement of gimbal means 10. Thus, voice coil motor drive controller 90B constitutes a double feedback loop for position servo-control and angular velocity servo-control by virtue of angular velocity detector 94, which is provided in addition to position detector element 44*b*.

Figure 11:
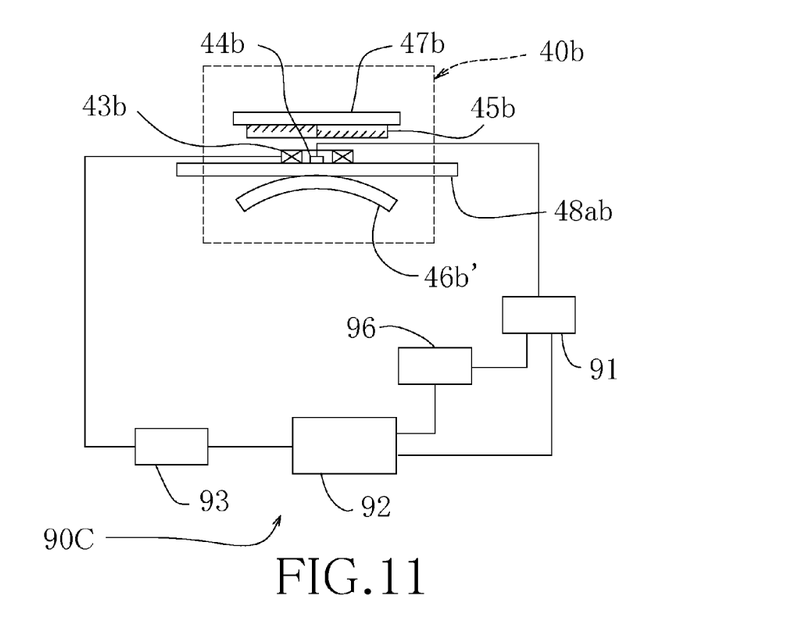
FIG. 11 is a block diagram showing still another example of the drive circuit for the voice coil motor of the present apparatus.

Further alternative voice coil motor drive controller 90C for first voice coil motor unit 40*b* is illustrated in FIG. 11. This voice coil motor drive controller is provided with differentiation circuit 96 between positional signal amplifier circuit 91 and the microcomputer. The differentiation circuit performs differentiation of a positional signal from position detector element 44*b* so as to convert it to an angular velocity signal. The microcomputer receives the position signal from positional signal amplifier circuit 91 and the angular velocity signal from differentiation circuit 96 to perform operation of a voice coil motor control signal which is sent to driver circuit 93 after amplification for voice coil motor control. The differentiation circuit may be carried in the microcomputer. In this instance, as expensive parts such as angular velocity detection means as well as the differentiation circuit are eliminated, the voice coil motor, including the drive controller, is significantly reduced in cost.

It is to be understood that although the present invention has been described with regard to preferred embodiments thereof, various other embodiments and variants may occur to those skilled in the art which are within the scope and spirit of the invention, and such other embodiments and variants are intended to be covered by the following claims.

What is claimed is:

1. An optical, image stabilizer for a telescopic optical instrument having a telescopic optical system made up of an objective lens, an erect prism and an eyepiece lens arranged in this order and mounted on a telescope housing, the erect prism being capable of rotating on first and second axes of rotation which intersect at right angles in a plane perpendicular to an optical axis of the telescopic optical system so as thereby to compensate for deteriorations of a telescopic optical Image caused due to external vibrations, the optical image stabilizer comprising:

gimbal means for mounting thereon the erect prism, said gimbal means comprising:

a gimbal casing fixedly mounted on the telescope housing;

an external gimbal frame rotatably mounted on the gimbal casing so as to cause rotational motion on the first axis of rotation; and an internal gimbal frame rotatably mounted on said external gimbal frame so as to cause rotational motion on the second axis of rotation, the erect prism being fixedly mounted on said internal gimbal frame;

first and second voice coil motors, disposed on opposite sides of either one of said, first and second axes of rotation, for causing rotational motion of said external gimbal on said first axis of rotation and said internal gimbal frame on said second axis of rotation, respectively, each said voice coil motor comprising a loop-shaped coil with an empty space, and a position detector element disposed in the empty space of said loop-shaped coil for providing a position signal indicating a position of said loop-shaped coil relative to said permanent magnet; and a circuit board fixedly mounted on a single side of said external gimbal frame and provided thereon with a driver circuit for actuating each said voice coil motor according to said position signal;

wherein said loop-shaped coil of each said voice coil motor and said position detector element are fixedly mounted on said circuit board, said permanent magnet of each said first voice coil motor for said external gimbal frame is fixedly mounted on said gimbal casing oppositely to said loop-shaped coil of said first voice coil motor for said external gimbal frame, and said permanent magnet of said second voice coil motor for said internal gimbal frame is mounted on said internal gimbal frame oppositely to said loop-shaped coil of said second voice coil motor for said internal gimbal frame.

2. The optical image stabilizer as defined in claim 1, wherein each of said first and second voice coil motors further comprises a first yoke member in the form of a flat plate through which said permanent magnet is mounted on either one side internal and said external gimbal frame, and a second yoke member in the form of a rectangular flat plate through which said loop-shaped coil and said position detector element are mounted on said circuit board.

3. The optical image stabilizer as defined in claim 2, and further comprising an angular velocity detector which provides an angular velocity signal indicating an angular displacement of the erect prism resulting from external vibrations for drive control of said voice coil motor.

4. The optical image stabilizer as defined in claim 2, wherein a signal from said position detector element of said voice coil motor which primarily indicates a position of said loop-shaped coil relative to said permanent magnet provides said drive circuit on said circuit board with an angular velocity signal indicating an angular displacement of the erect prism resulting from external vibrations for drive control of said voice coil motor.

5. The optical image stabilizer as defined in claim 2, wherein said telescopic optical instrument is a monocular device.

6. The optical image stabilizer as defined in claim 2, wherein said telescopic optical instrument is binoculars having a pair of said telescopic optical systems arranged in parallel.

7. The optical image stabilizer as defined in claim 1, wherein each said first and second voice coil motors further comprises a first yoke member through which said permanent magnet is mounted on either one of said internal and said external gimbal frame, a second yoke member through which said loop-shaped coil and said position detector element are mounted on said circuit board, wherein said second yoke member of said first voice coil motor is curved around a rotative direction of said external gimbal frame with a curvature radius approximately equal to a distance between the first axis of rotation and said second yoke member.

8. The optical image stabilizer as defined in claim 7, and further comprising an angular velocity detector which provides an angular velocity signal indicating an angular displacement of the erect prism resulting from external vibrations for drive control of said voice coil motor.

9. The optical image stabilizer as defined in claim 8, wherein said drive circuit on said circuit board is configured to drive said voice coil motors to control rotation of said gimbal frames of said gimbal means according to said position signal and said angular velocity signal, thereby retaining said gimbal means in an initial state wherein the erect prism is stabilized in the original position that existed before being subjected to external vibrations.

10. The optical image stabilizer as defined in claim 7, wherein a signal from said position detector element of said voice coil motor which primarily indicates a position of said loop-shaped coil relative to said permanent magnet provides said drive circuit on said circuit board with an angular velocity signal indicating an angular displacement of the erect prism resulting from external vibrations for drive control of said voice coil motor.

11. The optical image stabilizer as defined in claim 7, wherein said drive circuit on said circuit board is configured to drive said voice coil motors to control rotation of said gimbal frames of said gimbal means according to said position signal and said angular velocity signal, thereby retaining said gimbal means in an initial state wherein the erect prism is stabilized in the original position that existed before being subjected to external vibrations.

12. The optical image stabilizer as defined in claim 7, wherein said telescopic optical instrument is a monocular device.

13. The optical image stabilizer as defined in claim 7, wherein said telescopic optical instrument is binoculars having a pair of said telescopic optical systems arranged in parallel.

14. An optical image stabilizer as defined as claim 7, wherein said first yoke member of each said voice coil member and said second yoke member of said second voice coil motor are shaped in the form of a rectangular flat plate.

15. The optical image stabilizer as defined in claim 1, and further comprising an angular velocity detector which provides an angular velocity signal indicating an angular displacement of the erect prism resulting from external vibrations for drive control of said voice coil motor.

16. The optical image stabilizer as defined in claim 15, wherein said drive circuit on said circuit board is configured to drive said voice coil motors to control rotation of said gimbal frames of said gimbal means according to said position signal and said angular velocity signal, thereby retaining said gimbal means in an initial state wherein the erect prism is stabilized in the original position that existed before being subjected to external vibrations.

17. The optical image stabilizer as defined in claim 1, wherein a signal from said position detector element of said voice coil motor which primarily indicates a position of said loop-shaped coil relative to said permanent magnet provides said driver circuit on said circuit board with an angular velocity signal indicating an angular displacement of the erect prism resulting from external vibrations for drive control of said voice coil motor.

18. The optical image stabilizer as defined in claim 1, wherein said telescopic optical instrument is a monocular device.

19. the optical image stabilizer as defined in claim 1, wherein said telescopic optical instrument is binoculars having a pair of said telescopic optical systems arranged in parallel.

* * * * *